(12) United States Patent
Kimura et al.

(10) Patent No.: US 10,427,601 B2
(45) Date of Patent: Oct. 1, 2019

(54) WORKING MACHINE

(71) Applicant: HONDA MOTOR CO., LTD., Tokyo (JP)

(72) Inventors: Yuta Kimura, Wako (JP); Yoshimasa Teruya, Wako (JP); Jun Fukano, Wako (JP); Tsutomu Mizoroke, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/978,569

(22) Filed: May 14, 2018

(65) Prior Publication Data

US 2019/0031099 A1 Jan. 31, 2019

(30) Foreign Application Priority Data

Jul. 31, 2017 (JP) .................................. 2017-148283

(51) Int. Cl.
| | |
|---|---|
| *B60Q 9/00* | (2006.01) |
| *B60Q 1/04* | (2006.01) |
| *E01H 5/09* | (2006.01) |
| *E01H 5/06* | (2006.01) |
| *B60Q 1/00* | (2006.01) |
| *F21S 43/30* | (2018.01) |
| *F21S 43/20* | (2018.01) |

(Continued)

(52) U.S. Cl.
CPC ............. *B60Q 9/00* (2013.01); *B60Q 1/0041* (2013.01); *B60Q 1/04* (2013.01); *E01H 5/061* (2013.01); *E01H 5/098* (2013.01); *B60Q 1/24* (2013.01); *B60Q 2400/50* (2013.01); *F21S 41/30* (2018.01); *F21S 43/26* (2018.01); *F21S 43/30* (2018.01)

(58) Field of Classification Search
CPC ...... B60Q 1/0017; B60Q 1/0047; B60Q 1/02; B60Q 1/04; B60Q 1/18; B60Q 1/24; B60Q 1/26; B60Q 9/00
See application file for complete search history.

(56) References Cited

U.S. PATENT DOCUMENTS

| | | | |
|---|---|---|---|
| 8,205,360 B1 | 6/2012 | Vanneman et al. | |
| 2014/0055252 A1* | 2/2014 | Ascencio ................. | B60Q 1/50 340/425.5 |

(Continued)

FOREIGN PATENT DOCUMENTS

| | | |
|---|---|---|
| JP | 2001-206687 A | 7/2001 |
| JP | 2008-308833 | 12/2008 |

(Continued)

OTHER PUBLICATIONS

European Search Report dated Jan. 2, 2019, 7 pages.

(Continued)

*Primary Examiner* — Laura N Nguyen
(74) *Attorney, Agent, or Firm* — Rankin, Hill & Clark LLP (57) ABSTRACT

Visibility of information that is provided to a worker is enhanced. A working machine includes an indicator device that functions as an information providing unit that provides information of a machine body to the worker, and the indicator device emits an indicator light to a ground that is located in front of the working machine and is exposed to a worker side that is located at a manipulation position.

5 Claims, 9 Drawing Sheets

(51) Int. Cl.
    *F21S 41/30*     (2018.01)
    *B60Q 1/24*     (2006.01)

(56)           References Cited

U.S. PATENT DOCUMENTS

| | | | |
|---|---|---|---|
| 2015/0145701 A1* | 5/2015 | Beggs | B60Q 1/2673 |
| | | | 340/944 |
| 2016/0207443 A1* | 7/2016 | Widdowson | B60Q 1/0011 |
| 2017/0144591 A1* | 5/2017 | Yatsu | F21S 41/125 |
| 2017/0210282 A1* | 7/2017 | Rodriguez Barros | G03B 21/00 |
| 2017/0217361 A1* | 8/2017 | Miller | B60Q 1/22 |
| 2018/0029641 A1* | 2/2018 | Solar | B62D 15/0275 |
| 2018/0118095 A1* | 5/2018 | Kunii | B60Q 1/26 |
| 2018/0265340 A1* | 9/2018 | Luminet | B60Q 1/0483 |
| 2018/0328564 A1* | 11/2018 | Albou | B60Q 1/50 |

FOREIGN PATENT DOCUMENTS

| | | | |
|---|---|---|---|
| JP | 2013-074972 A | | 4/2013 |
| JP | 2015-081478 | | 4/2015 |
| WO | 2015/032795 A2 | | 3/2015 |
| WO | 2015/141080 A1 | | 4/2017 |

OTHER PUBLICATIONS

Japanese Office Action with English translation dated Mar. 12, 2019, 15 pages.
Japanese Office Action dated Aug. 20, 2019, Application No. JP 2017-148283, English machine translation included 10 pages.

* cited by examiner

WORKING MACHINE

INCORPORATION BY REFERENCE

The present application claims priority under 35 U.S.C. § 119 to Japanese Patent Application No. 2017-148283 filed on Jul. 31, 2017. The content of the application is incorporated herein by reference in its entirety.

BACKGROUND OF THE INVENTION

Field of the Invention

The present invention relates to a working machine including an information providing unit that provides information to a worker.

Description of the Related Art

In working machines, there is known a walking type snowplow including an indicator lamp that provides information to a worker (refer to Patent Literature 1, for example). In Patent Literature 1, as the indicator lamp, a reset display light is provided on an operation panel that is operated by a worker, and the reset display light makes it possible to visually recognize whether or not an auger housing is automatically adjusted to a horizontal position.

Patent Literature 1: Japanese Patent Laid-Open No. 2015-081478

SUMMARY OF THE INVENTION

However, in the conventional configuration, the indicator lamp is in the vicinity of the hand of a worker, and a line of sight of the worker performing the operation faces forward, so that the worker is unlikely to notice lighting of the indicator lamp. Therefore, when a warning is reported by the indicator lamp, there arises the risk that the worker does not notice the warning and continues the operation.

Therefore, an object of the present invention is to increase visibility of information that is provided to the worker.

In order to achieve the above described object, an aspect of the present invention provides a working machine including an information providing unit that provides information to a worker, wherein the information providing unit includes an indicator device that emits an indicator light indicating the information, and the indicator device emits the indicator light to a ground located in front of the working machine and exposed to a worker side, or a surface exposed to the worker side in a front portion of the working machine.

According to the configuration, the worker performing the operation can visually recognize the information indicated by the indicator light while looking forward, and visibility of the information is enhanced.

In the above described configuration, the indicator light is a light indicating at least any one of images including a color, flashing, and a character. According to the configuration, information can be displayed in various display modes.

Further, in the above described configuration, an illumination device that illuminates an area ahead of the working machine is included, wherein an emitting direction of the indicator light deviates from an optical axis of an illuminating light of the illumination device. According to the configuration, visibility of the information indicated by the indicator light is more enhanced.

Further, in the above described configuration, the indicator device emits the indicator light to a region outside an irradiation range of the illumination device. According to the configuration, visibility of the information indicated by the indicator light is more enhanced.

Further, in the above described configuration, the indicator device is disposed on the illumination device. According to the configuration, the indicator light can be emitted to a position closer to the machine body than the irradiation range of the illumination device.

Further, in the above described configuration, a working unit is included at a front portion of the working machine, wherein the indicator device emits the indicator light to a surface that is exposed to the worker side in the working unit. According to the configuration, the worker performing the operation can be prevented from overlooking the information, and the display quality of the information indicated by the indicator light is not influenced by the ground.

According to the aspect of the present invention, visibility of the information which is provided to the worker can be enhanced.

DETAILED DESCRIPTION OF THE PREFERRED EMBODIMENTS

Hereinafter, embodiments of the present invention will be described with reference to the drawings.

First Embodiment

Figure 1:
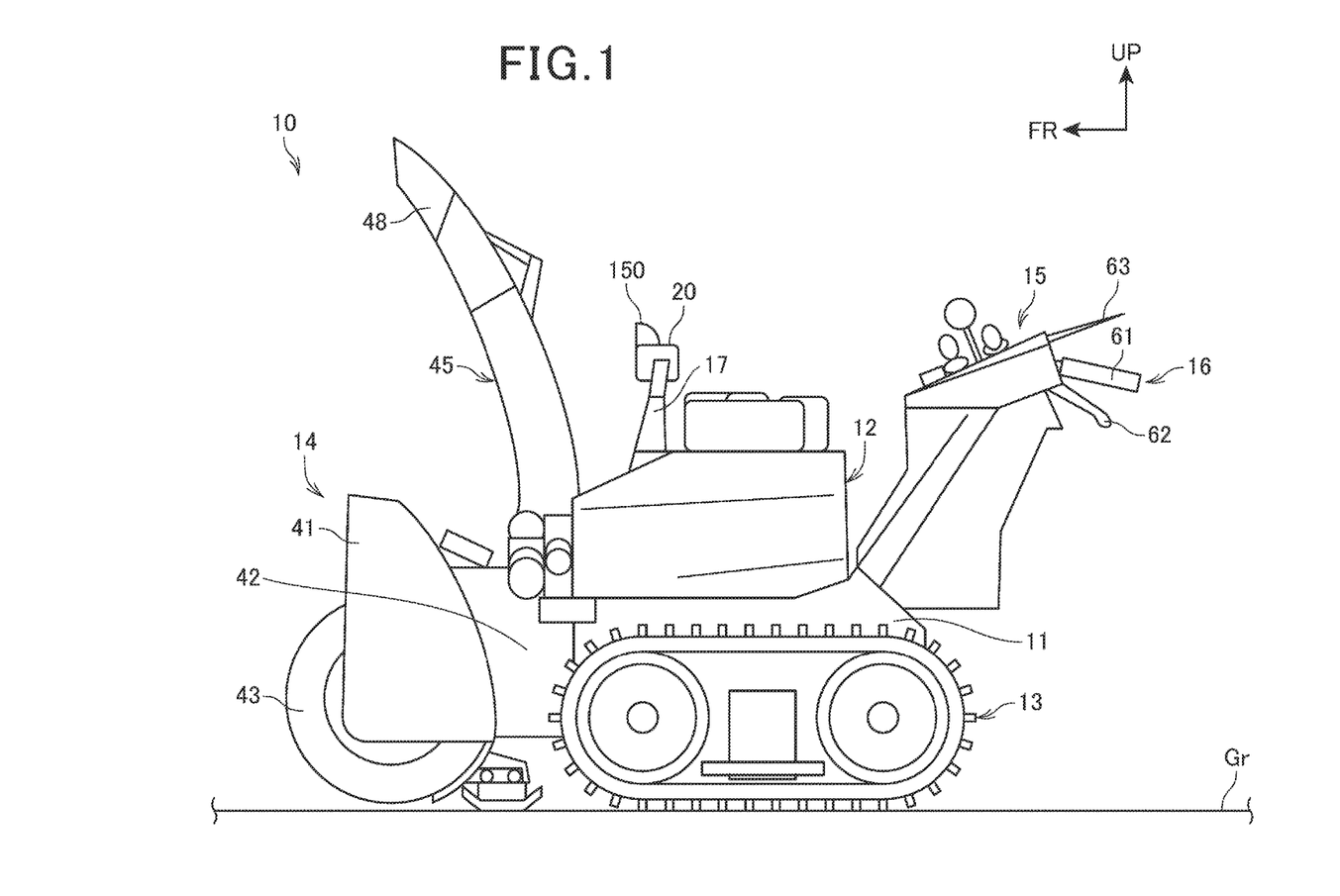
FIG. 1 is a side view of a working machine according to a first embodiment of the present invention.
Figure 2:
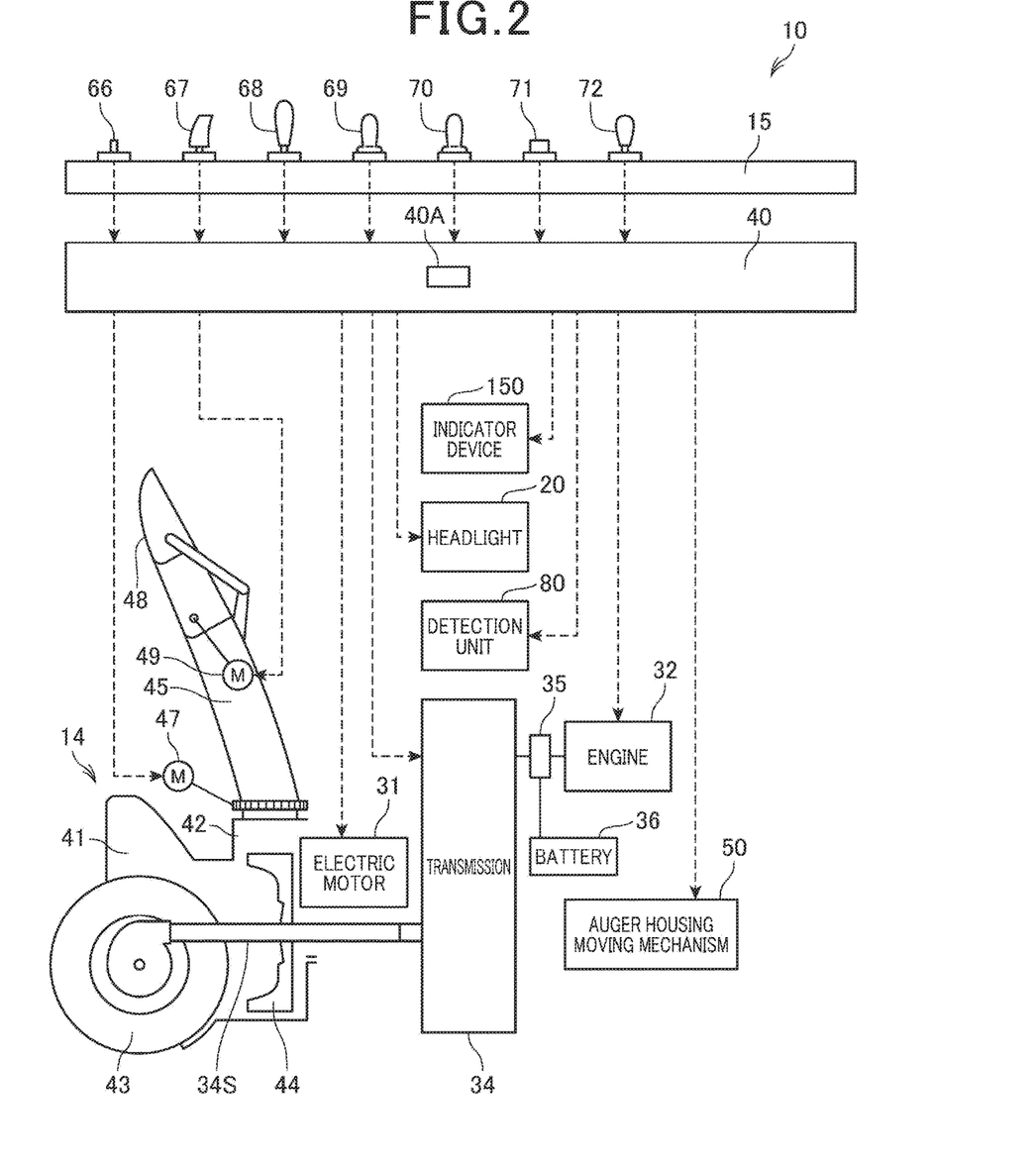
FIG. 2 is a diagram schematically illustrating a configuration of the working machine.

FIG. 1 is a side view of a working machine 10 according to a first embodiment of the present invention. Further, FIG. 2 is a diagram schematically illustrating a configuration of the working machine 10. Note that description of respective directions such as forward and rearward, left and right, and up and down indicate the respective directions with the working machine 10 as a reference. In FIG. 1 a forward direction is denoted by reference sign FR, and an upper direction is denoted by reference sign UP.

As illustrated in FIG. 1, the working machine 10 is a self-propelled type snowplow (also referred to as a walking type snowplow), which includes a power source 12, a travel device 13 (a travel unit), a snow removal working unit 14 (a working unit) and an operation panel 15 (also referred to as an operation device), in a machine body 11 (corresponding to a vehicle body frame). From a rear portion of the machine body 11 to a rear upper part, an operation handle 16 extends. A worker (also referred to as a manipulator, and an operator) who performs snow removal work grasps the operation handle 16 behind the working machine 10, and manipulates the working machine 10 while walking with the working machine 10. That is, the working machine 10 is a manned working machine.

The power source 12 is provided in a longitudinal center of the working machine 10, and a pair of arms 17 is vertically provided from a front upper portion of the power source 12 with a space left laterally. At upper ends of these arms 17, headlights 20 (illumination devices) that emit illuminating light are supported. The headlights 20 are disposed rearward of the snow removal working unit 14 (an auger housing 41, a chute 45 and the like described later) disposed at a front portion of the machine body 11, and upward of the auger housing 41, and are disposed at vehicle width central positions which are displaced in the lateral direction with respect to the chute 45. Thereby, illuminating light can be emitted forward of the working machine 10 (forward of the auger housing 41) while avoiding the chute 45.

The power source 12 drives the travel device 13 and the snow removal working unit 14, and has an electric motor 31 illustrated in FIG. 2, and an engine 32 illustrated in FIG. 2. The electric motor 31 drives the travel device 13 under control of a control unit 40 illustrated in FIG. 2. In the present configuration, crawler type travel devices 13 are included with a space left laterally, and the different electric motors 31 drive the respective travel devices 13 via speed reduction mechanisms respectively.

The engine 32 is an internal combustion engine, and drives the snow removal working unit 14 via a transmission 34 under control of the control unit 40. A generator 35 is provided at a drive shaft of the engine 32. Electric power generated by the generator 35 is supplied to electric components of the working machine 10, such as a battery 36, the electric motors 31 and the headlights 20. The travel device 13 may be configured to be driven by the engine 32.

As illustrated in FIGS. 1 and 2, the snow removal working unit 14 includes the auger housing 41, a blower housing 42 that is connected to a rear portion of the auger housing 41, an auger 43 that is provided in the auger housing 41, a blower 44 provided in the blower housing 42, and the chute 45 that extends upward from the blower housing 42.

The auger housing 41 is a cover that covers an upper part, a rear part and both left and right sides of the auger 43, and covers the auger 43 in a state where a front part and a lower part of the auger 43 are exposed.

The auger 43 is rotationally driven by rotation of an output shaft 34S of the transmission 34, and scrapes off snow in front of the working machine 10. The blower 44 supplies snow that is scraped off by the auger 43 to the chute 45 under control of the control unit 40, and blows the snow to a distant position by the chute 45. That is, the chute 45 functions as a snow throwing section that throws snow that is raked up by the auger 43 to a position away from the working machine 10.

The chute 45 is provided rotatably around an axis extending in a vertical direction, with respect to an installation surface Gr (corresponding to a travel surface on which the working machine 10 travels) on which the travel devices 13 are grounded, and is rotationally driven by a chute drive motor 47. A snow throwing direction is adjustable to an arbitrary direction of forward, rearward, left and right by the chute 45 rotating.

A chute guide 48 is provided at an upper end portion of the chute 45. The chute guide 48 is mounted swingably up and down, and an angle in the vertical direction (that is, a snow throwing angle) is adjustable. The chute guide 48 has the snow throwing angle controlled by a guide drive motor 49.

As illustrated in FIG. 1, the working machine 10 rakes up snow by the auger 43 in the front part, and can discharge the snow which is raked up to a distant place via the chute 45 by the blower 44, while traveling forward by the left and right travel devices 13.

Further, the working machine 10 includes an auger housing drive mechanism 50 that changes a posture of the auger housing 41. The auger housing drive mechanism 50 is configured by a raising and lowering drive mechanism that performs raising and lowering drive of the auger housing 41 with respect to the machine body 11, and a rolling drive mechanism that performs rolling (lateral swing) drive of the auger housing 41 with respect to the machine body 11. Thereby, a height of the auger housing 41 can be changed and an orientation to the lateral direction can be changed. In this case, the auger 43 moves with the auger housing 41.

The control unit 40 has a CPU (Central Processing Unit) (not illustrated) and a memory 40A (FIG. 2) that stores programs and various data, and controls respective units of the working machine 10 by executing, by the CPU, the programs stored in the memory 40A. The control unit 40 is disposed in a vicinity of the operation panel 15.

As illustrated in FIG. 1, the operation handles 16 each has a grip 61 that is grasped by the worker, and left and right turning operation levers 62. Further, a left operation handle 16 has a travel preparation lever 63.

The control unit 40 allows drive of the travel devices 13 and the snow removal working unit 14 when the worker performs a predetermined operation (an operation of gripping the travel preparation lever 63 to lower the travel preparation lever 63 to a grip 61 side). Further, when the worker grips the left or right turning operation lever 62, the control unit 40 controls the travel devices 13 so as to turn the working machine 10 to a gripping side.

As illustrated in FIG. 2, the operation panel 15 includes a main switch 66, a throttle lever 67, a direction speed lever 68, an auger housing lever 69, a chute operation lever 70, an auger switch 71, a target working speed setting unit 72 and the like.

The main switch 66 is a manual operator that turns on an electric system and starts the engine 32. The throttle lever 67 is a manual operator for controlling an engine speed of the engine 32. The direction speed lever 68 is a manual operator for controlling rotation of the left and right travel devices 13.

The auger housing lever 69 is a manual operator that raises and lowers and rolls the auger housing 41 in accordance with a snow surface by the auger housing drive mechanism 50 at a time of snow removal work with the auger 43. The chute operation lever 70 is an operation member for changing orientations of the chute 45 and the chute guide 48 by the chute drive motor 47 and the guide drive motor 49.

The auger switch 71 is a manual operator that switches an electromagnetic clutch that is not illustrated and provided in a power transmission route between the auger 43 and the engine 32, enables power transmission when the auger switch 71 is on, and cuts off the power transmission when the auger switch 71 is off. That is, the control unit 40 drives the auger 43 and the blower 44 by the power of the engine 32, when the operation of lowering the travel preparation lever 63 to the grip 61 side, and the operation of turning on the auger switch 71 are performed.

The target working speed setting unit 72 is a manual operator that sets a target working rotation speed of the snow removal working unit 14. A snow throwing distance from the chute 45 is determined by the rotational speed of the blower 44, so that when the target working rotational speed of the snow removal working unit 14 is set, the snow throwing distance from the chute 45 is set. That is, the target working speed setting unit 72 is also a manual operator (a snow throwing distance lever) that sets the snow throwing distance.

Further, the working machine 10 includes a detection unit 80 (FIG. 2) that detects information necessary for the control unit 40 to control the respective units of the working machine 10. That is, the detection unit 80 includes sensors for detecting information on the respective units of the working machine 10 (in the present configuration, a rotational speed of the snow removal working unit 14 (a rotational speed of the auger 43), an engine speed of the engine 32, a height of the auger housing 41, an inclination angle of the auger housing 41 to a gravitational center direction, a rolling position of the auger housing 41 and the like). As for these sensors, sensors of the conventional snowplow are applicable.

The working machine 10 includes an indicator device 150 on the headlight 20. The headlight 20 and the indicator device 150 are turned on and off by using electric power of the battery 36 under control of the control unit 40.

Figure 3:
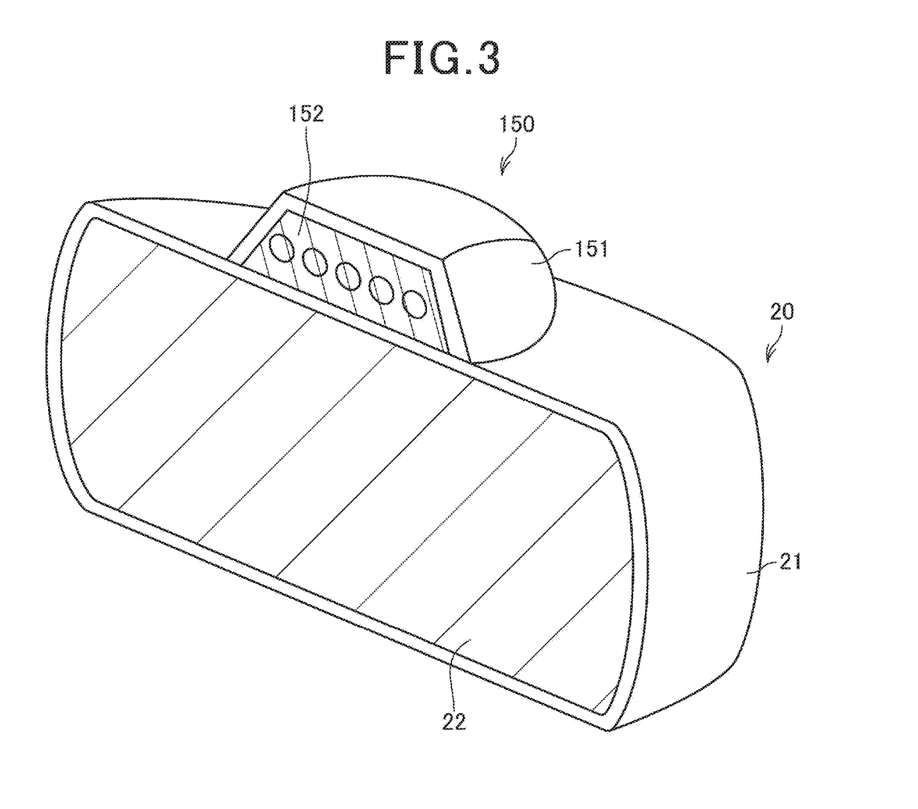
FIG. 3 is a perspective view illustrating an indicator device with a headlight.
Figure 4:
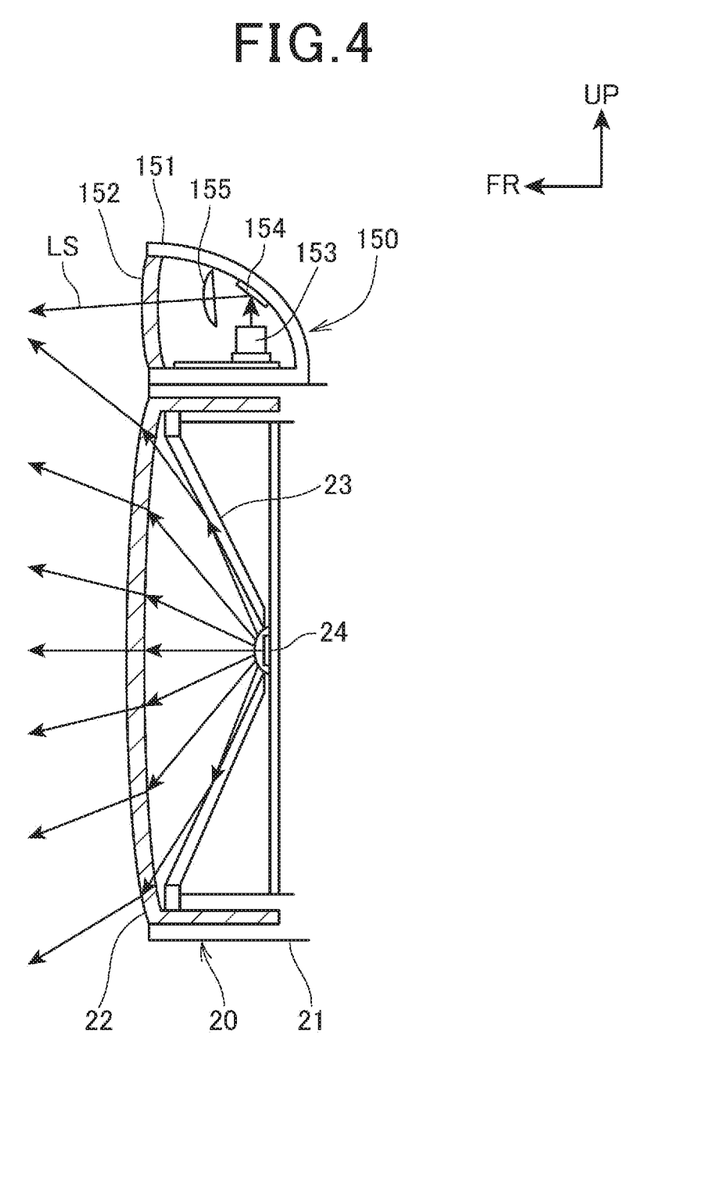
FIG. 4 is a sectional side view illustrating the indicator device with the headlight.

FIG. 3 is a perspective view illustrating the indicator device 150 with the headlight 20. Further, FIG. 4 illustrates a sectional side view of FIG. 3.

The headlight 20 is configured by a case 21 configuring an outer sheath of the headlight 20, a transparent cover 22 provided on a front surface of the case 21, a reflector 23 (FIG. 4) provided between the case 21 and the transparent cover 22, and an LED module 24 configuring a light source that is housed in the case 21.

Light from the LED module 24 is emitted forward of the machine body 11 via the transparent cover 22, and illuminates an area ahead of the working machine 10 with a large amount of light suitable for the operation. The reflector 23 distributes the light from the LED module 24 to a proper range including the working region. The headlight 20 is controlled to light constantly, for example, that is, is lit when the main switch 66 of the operation panel 15 is turned on, and lights out when the main switch 66 is turned off.

The indicator device 150 is a device that functions as an information providing unit that provides information on the machine body 11 to the worker, is configured integrally with the headlight 20, and emits indicator lights LS indicating information on the machine body 11 from a top side of the headlight 20.

As illustrated in FIG. 3, the indicator device 150 includes a case 151 configuring an outer sheath of the indicator device 150, and a transparent cover 152 provided on a front surface of the case 151.

As illustrated in FIG. 4, the indicator device 150 is a laser illumination device with a semiconductor laser 153 as a light source, and emits laser light which is emitted by the semiconductor laser 153 to a forward direction that is an emitting direction via a reflection mirror 154, a lens 155 and the transparent cover 152. Since laser light is used, the indicator light LS with high luminance and excellent in directivity can be emitted.

In the present configuration, as illustrated in FIG. 4, the semiconductor laser 153 is disposed to emit light upward, and the emitted light is reflected forward by the reflection mirror 154. Further, the light reflected by the reflection mirror 154 is emitted forward via the lens 155.

Specifications of the semiconductor laser 153, a reflection shape of the reflection mirror 154, and optical properties of the lens 155 are properly selected or adjusted, and thereby a color, brightness, an emitting direction, an irradiation range, a beam shape and the like of the indicator light LS are set. In the present configuration, the respective units are selected or adjusted so that the indicator light LS with which the ground is irradiated becomes a predetermined indicator lamp as seen from the worker grasping the operation handle 16, that is, the worker located at a manipulation position.

Figure 5:
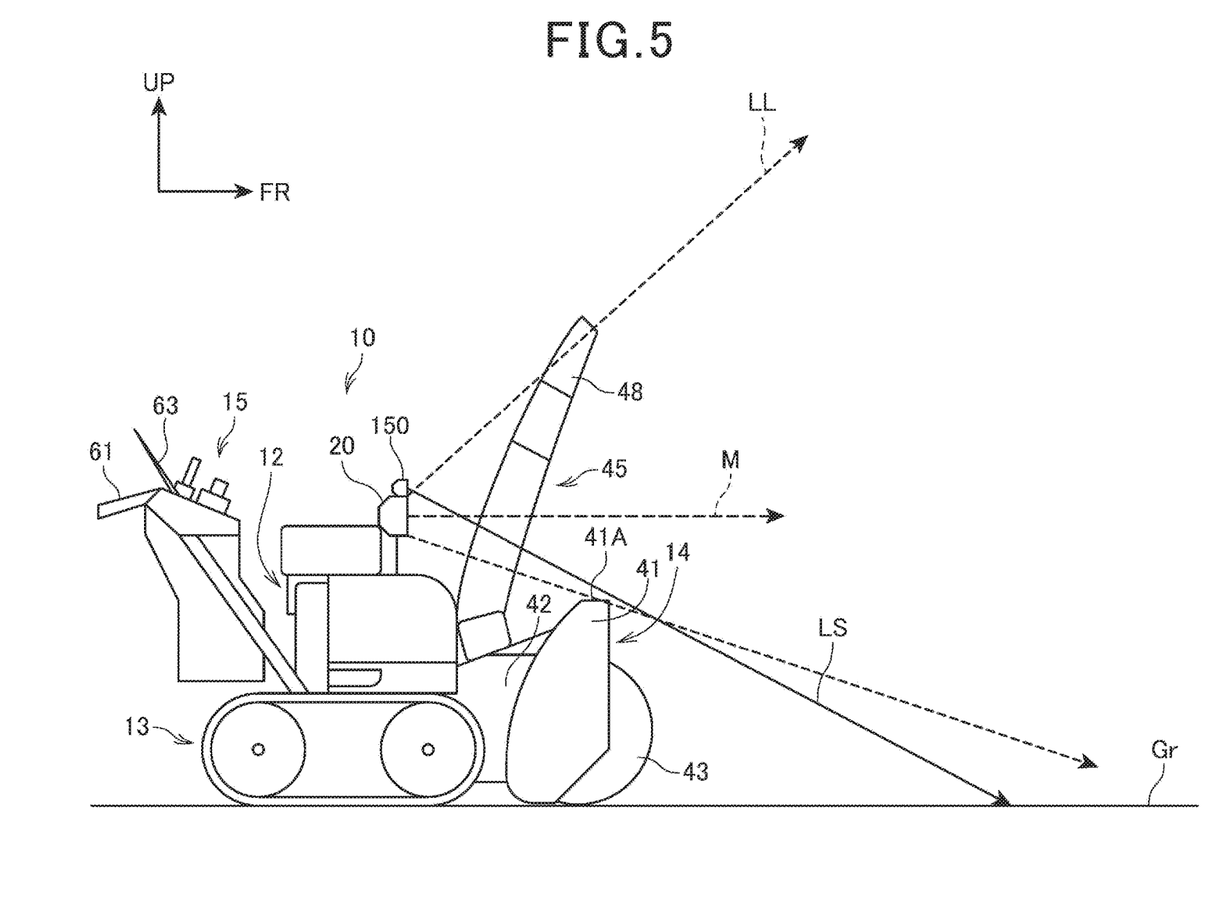
FIG. 5 is a view illustrating irradiation ranges of the headlight and the indicator device as the working machine is seen from a side.

FIG. 5 is a view illustrating irradiation ranges of the headlight 20 and the indicator device 150 as the working machine 10 is seen from a side. In FIG. 5, light from the headlight 20 is shown by being assigned with reference sign LL, and light from the indicator device 150 is shown by being assigned with reference sign LS. Hereinafter, when the lights LL and LS are described by being specially discriminated, the lights LL and LS will be described as the light LL, and the indicator light LS respectively.

As illustrated in FIG. 5, the light LL expands vertically as it advances forward, irradiates a ground (the installation surface Gr) exposed in front of the machine body 11, and can illuminate a wall of snow when the wall of snow is present in front of the machine body 11.

In the present configuration, the light LL passes through a vicinity of a top surface 41A of the auger housing 41 and is emitted to the ground. Thereby, a region as close as possible to the auger housing 41 is irradiated with the light LL, of a region which can be irradiated in front of the auger housing 41 from the headlight 20. Further, the light LL also expands laterally as advancing forward. Thereby, the snow removal region in front of the auger housing 41 is sufficiently illuminated.

In the working machine 10 of the present embodiment, the headlight 20 is disposed at a position where a height from the ground (the installation surface Gr) becomes lower than the line of sight of people being around, and the light LL hardly enters the visual fields of people in the surroundings. An optical axis M (a maximum luminous intensity axis of the light LL) of the headlight 20 of the present embodiment is set horizontally, but the light LL may be made harder to enter the visual fields of people in the surroundings by directing the optical axis M to a lower side from horizontality.

As illustrated in FIG. 5, an emitting direction of the indicator light LS deviates from the optical axis M of the light LL from the headlight 20, and the indicator light LS is emitted toward a lower front side by passing through a vicinity of the top surface 41A of the auger housing 41 from the top side of the headlight 20. Therefore, the region closer to the auger housing 41 (corresponding to the ground (the installation surface Gr)) than the light LL is irradiated with the indicator light LS. Further, the irradiation region (the ground (the installation surface Gr)) of the indicator light LS is a surface that is exposed to the worker side. The surface which is exposed to the worker side is the surface which is exposed to the side of the worker (more specifically, a head part side of the worker) operating the working machine 10 without being shielded by the respective units of the working machine 10, in other words, is a surface that enters the visual field of the worker who visually recognizes an area ahead or a lower area ahead.

Figure 6:
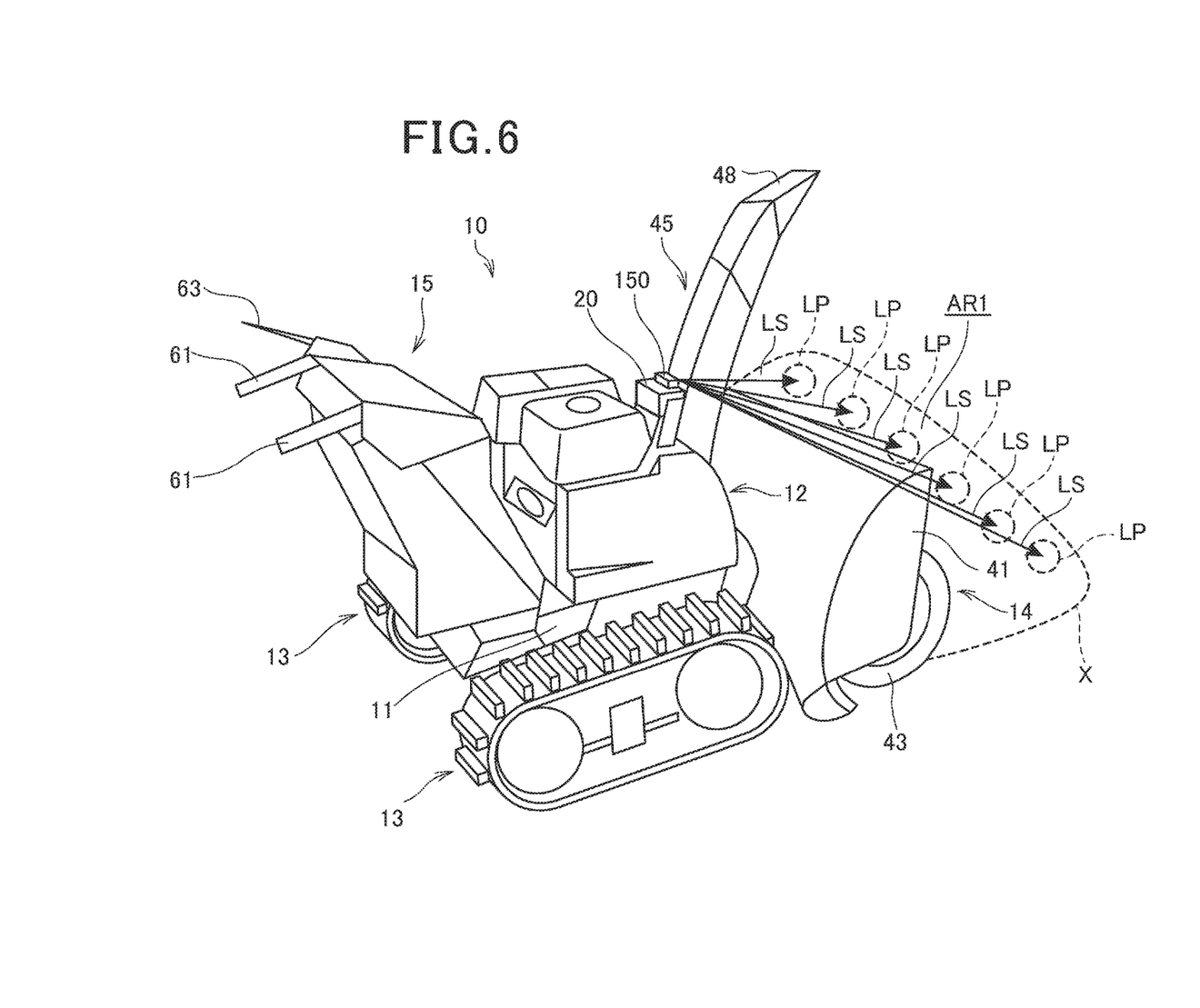
FIG. 6 is a view illustrating an irradiation range of the indicator device as the working machine is seen from an upper rear side.

FIG. 6 is a view illustrating the irradiation range of the indicator device 150 as the working machine 10 is seen from an upper rear side. As illustrated in FIG. 6, the indicator device 150 emits a plurality of (six) indicator lights LS toward a lower area ahead, with spaces left laterally. More specifically, the indicator device 150 includes a plurality of (six) semiconductor lasers 153, and emits the indicator lights LS from the respective semiconductor lasers 153 with the spaces left laterally. Thereby, a plurality (six) of indicator lamps (denoted by reference sign LP in FIG. 6) are displayed.

The indicator lights LS are emitted to the region which is outside the irradiation range of the light LL and is closer to the auger housing 41, so that indicator lamps LP are displayed in a region AR1 (a region enclosed by a wave line X in FIG. 6) in which a shadow is formed by the auger housing 41. Thereby, visibility of the indicator lamps LP is enhanced as compared with a case of displaying the indicator lamps LP in the irradiation range of the light LL. Note that the display positions of the indicator lamps LP are positions which the worker at the manipulation position can visually recognize.

FIG. 6 illustrates a case where the indicator lamps LP each in a round shape are configured to be able to be displayed on the ground by the respective indicator lights LS, and the respective indicator lights LS are turned on and off in accordance with the information on the machine body 11 which is assigned in advance, by the control unit 40.

Thereby, the indicator lamps LP such as a switch lamp that is turned on in association with an on operation of the main switch 66, a warning lamp that reports a predetermined warning, and a reversing lamp that is turned on in association with a reversing operation by the throttle lever 67 are displayed, for example. Which indicator lamp LP is displayed can be properly changed by changing the control of the control unit 40.

The indicator lamp LP does not have to be limited to the indicator lamp LP in the round shape. For example, the indicator lamp LP in an arbitrary shape such as a square shape may be turned on and off by the indicator light LS, or the flashing indicator lamp LP may be displayed. Further, by changing the flashing pattern, various states of the machine body 11 may be reported.

Further, positions, sizes and the like of the respective indicator lamps LP which light on the ground may be changed by configuring the lens 155 and the like to be movable. Further, by applying a known irradiation position control technique of laser, the control unit 40 may display an image including characters by the indicator light LS. The image which is displayed in this case may be either a still image or a moving image.

As described above, the working machine 10 of the present embodiment includes the indicator device 150 which functions as the information providing unit that provides the information on the machine body 11 to the worker, emits the indicator light LS to the area ahead of the snow removal working unit 14, and thereby irradiates the ground which is located in front of the working machine 10 and is exposed to the worker side (the head part side of the worker) who is at the manipulation position with the indicator light LS.

Thereby, the worker performing the operation can visually recognize the information indicated by the indicator light LS while looking forward, and visibility of the information is enhanced. Further, not only visual point movement is less, but also focus adjustment can be less, and this also enhances visibility of the information. Accordingly, the worker performing the operation can easily recognize the information without dropping the line of sight, and can be prevented from overlooking the information. For example, when a warning is displayed by the indicator light LS, the worker can notice the warning immediately.

Further, the indicator light LS is made a light indicating at least any one of images including a color, flashing, and a character, and thereby information can be displayed in various display modes. In addition, a laser light is used for the indicator light LS, so that information can be shown by the light with high luminance and excellent in directivity, and it is possible to display characters with high definition and easy to see, a pattern or the like by using a known laser technique.

Note that the light source is not limited to laser light. For example, instead of the semiconductor laser 153, another known light source such as LED, a light emitting element other than LED, or halogen lamp may be used.

Further, the indicator device 150 emits the indicator light LS to the ground that is exposed in front of the working machine 10, so that information can be displayed on the working region which the worker performing the operation sees, or in the vicinity of the working region, and the worker easily notices the information.

In this way, the indicator light LS is emitted to the ground, so that the ground becomes a projection destination of the image shown by the indicator light LS. Therefore, the working machine 10 does not have to be additionally provided with a projection place to which the indicator light LS is projected, which is advantageous in simplification of the configuration.

Further, the emitting direction of the indicator light LS deviates from the optical axis M of the light LL from the headlight 20, so that visibility of the information shown by the indicator light LS is more enhanced.

Further, the indicator device 150 emits the indicator lights LS to the area AR1 (FIG. 6) outside the irradiation range of the headlight 20 which is the illumination device irradiating the area ahead, so that visibility of the information shown by the indicator light LS is more enhanced. The indicator light LS may be emitted to the region (an irradiation region of a so-called leaking light) where a light amount of the light LL is relatively small, without being limited to the region to which the light LL from the headlight 20 is not emitted completely.

In addition, the indicator device 150 is disposed on the headlight 20, so that the indicator light LS can be emitted to the position closer to the machine body 11 than the irradiation range of the headlight 20 (refer to FIGS. 5 and 6). Thereby, as described above, the indicator light LS can be emitted to the region where the shadow of the working machine 10 is formed by the light from the headlight 20, while the area ahead close to the machine body 11 is illuminated by the headlight 20. Accordingly, it is possible to achieve compatibility between forward visibility and visibility of the information.

Further, the indicator device 150 is disposed by using a space on the headlight 20, so that a disposition space for the indicator device 150 is easily ensured. Further, in the present configuration, the indicator device 150 and the headlight 20 are configured to be integrated. Thereby, some of the components of the illumination system such as the power supply and wiring are easily shared, the number of components is reduced, and size reduction is easily achieved. Thereby, the configurations concerning the indicator device 150 and the headlight 20 are simplified, which is advantageous in cost reduction and space saving.

Second Embodiment

Figure 7:
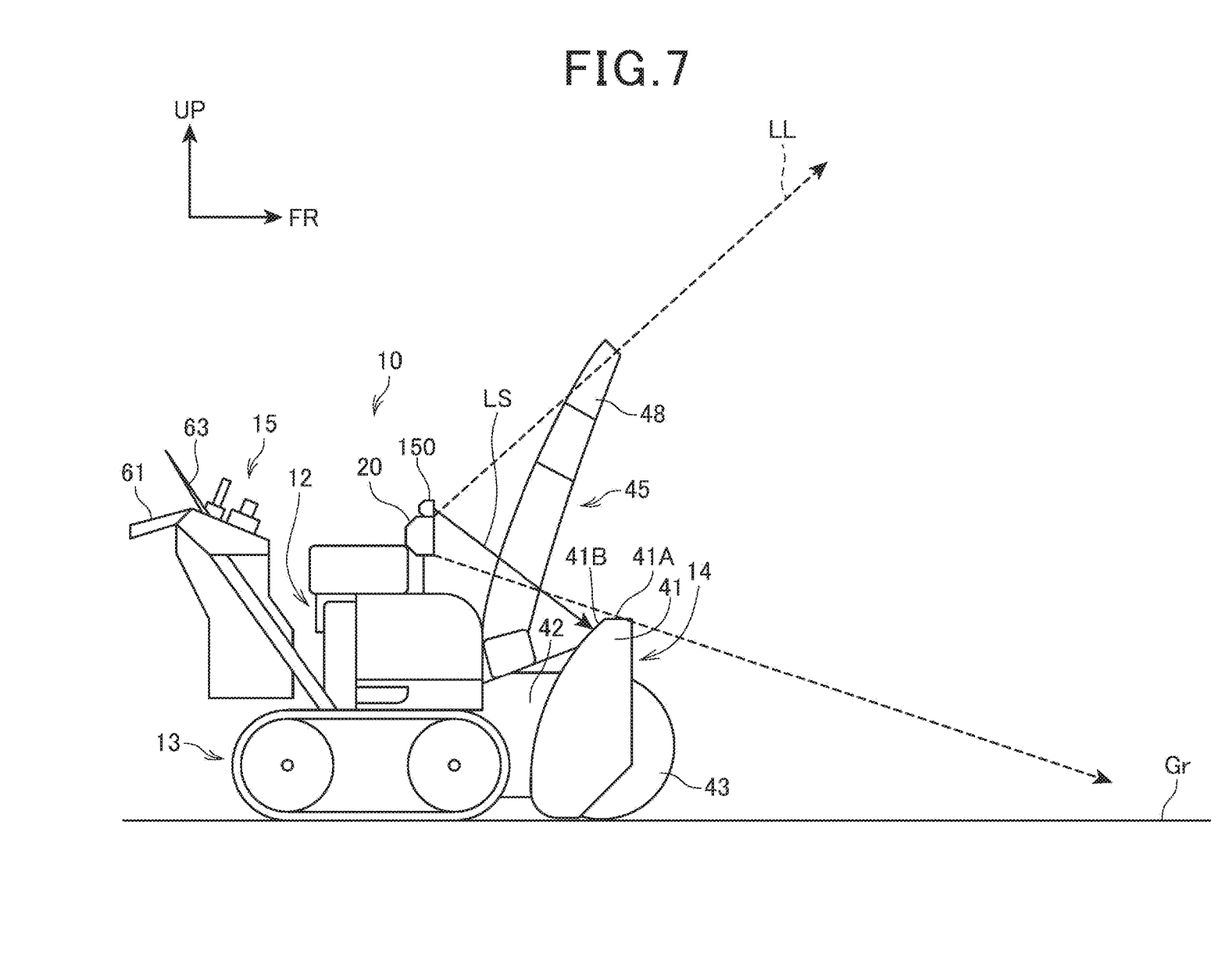
FIG. 7 is a view illustrating irradiation ranges of a headlight and an indicator device as a working machine according to a second embodiment is seen from a side.
Figure 8:
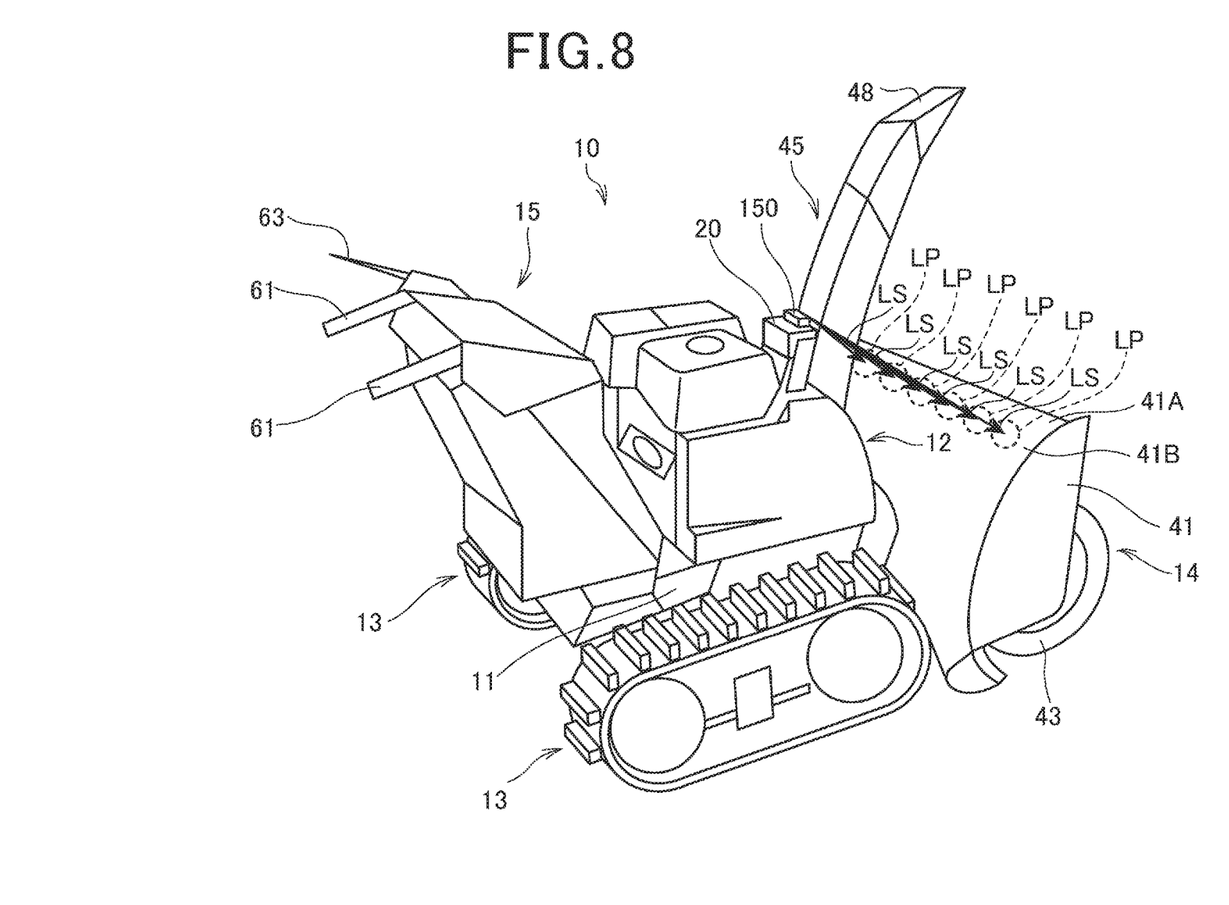
FIG. 8 is a view illustrating an irradiation range of the indicator device as the working machine is seen from an upper rear side.

FIG. 7 is a view illustrating irradiation ranges of the headlight 20 and the indicator device 150 as the working machine 10 according to a second embodiment is seen from a side. Further, FIG. 8 is a view illustrating the irradiation range of the indicator device 150 as the working machine 10 is seen from an upper rear side. Note that similar components as those in the first embodiment are illustrated by being assigned with the same reference signs, and different portions will be described hereinafter.

As illustrated in FIG. 7, the working machine 10 differs from the working machine 10 of the first embodiment in that the working machine 10 emits the indicator lights LS to a surface 41B (hereinafter, referred to as a rear top surface) located on a rear top portion of the auger housing 41 in the snow removal working unit 14.

As illustrated in FIG. 8, the indicator device 150 emits a plurality (six) of the indicator lights LS with spaces left laterally, toward the rear top surface 41B located at a lower front side. Colors, brightness, emitting directions, irradiation ranges, beam shapes and the like of the respective indicator lights LS are set to be able to display a plurality of indicator lamps LP on the rear top surface 41B.

The rear top surface 41B is a surface that inclines downward to a rear from a rear end of the top surface 41A of the auger housing 41 and continues in a lateral direction. The rear top surface 41B is a surface that is exposed to a worker side located at a manipulation position, and is a surface that enters a visual field of a worker performing the operation, in the snow removal working unit 14.

Thereby, various effects similar to the effects of the first embodiment that the worker performing the operation can visually recognize information (the indicator lamps LP) shown by the respective indicator lights LS without dropping a line of sight, and can be prevented from overlooking the information can be obtained.

Further, in the second embodiment, there is an advantage that the respective indicator lights LS are emitted to a part of the working machine 10, so that display quality of the information indicated by the respective indicator lights LS is not influenced by the ground.

In the second embodiment, it is preferable that the indicator light LS is emitted to the region outside the irradiation range of the light LL, or emitted to a region (an irradiation region of a so-called leaking light) where the light amount of the light LL is relatively small.

The aforementioned respective embodiments are only modes for carrying out the present invention, and modifications and applications can be made arbitrarily within the range without departing from the gist of the present invention.

For example, positions, shapes and the like of the indicator device 150 and the headlight 20 may be properly changed. Further, the case of the working machine 10 is of an auger type is described, but the working machine 10 may be of a dozer type, or configurations of a known snowplow may be applied to the configurations of the respective units of the working machine 10. Further, the working machine 10 is not limited to a snowplow, but may be a working machine other than a snowplow.

Figure 9A:
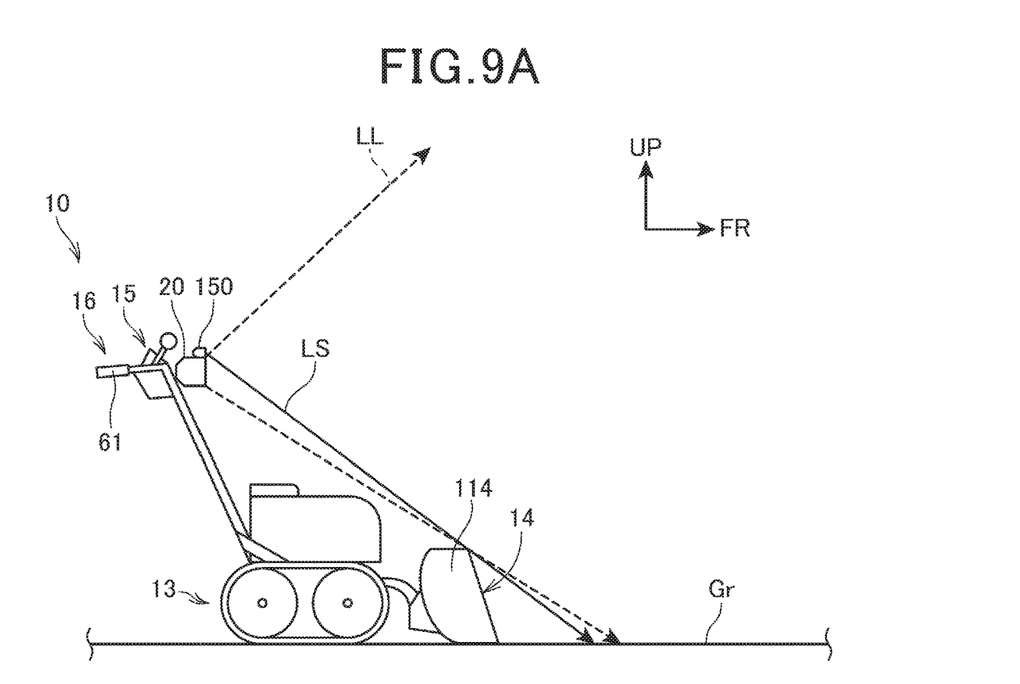
FIGS. 9A and 9B are views each illustrating irradiation ranges of a headlight and an indicator device as a working machine according to a modification example is seen from a side.

For example, as illustrated in FIG. 9A, the working machine 10 which is a dozer type of snowplow is provided with the indicator device 150, and the indicator device 150 may be configured to emit the indicator lights LS toward an area ahead of a dozer 114 that functions as a snow removal working unit.

In FIG. 9A, the headlight 20 is provided between the left and right operation handles 16 at uppermost positions of the pair of left and right operation handles 16 extending upward to the rear from the machine body 11, and the indicator device 150 is integrally provided on the headlight 20. This provides various effects that the light LL can be emitted to a position close to the dozer 114 from the headlight 20, and the indicator lights LS can be emitted to the position closer to the dozer 114 than the irradiation range of the headlight 20, as in the aforementioned first embodiment.

Figure 9B:
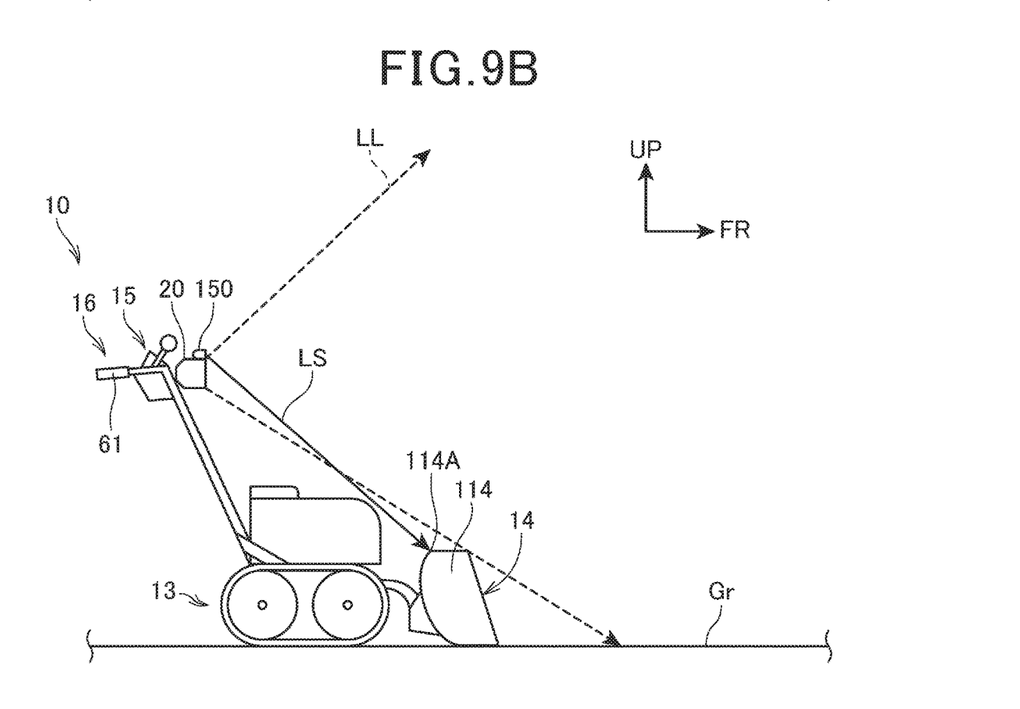

Further, as illustrated in FIG. 9B, the working machine 10 which is a dozer type of snowplow is provided with the indicator device 150, and the indicator device 150 may be configured to emit the indicator lights LS to a surface 114B (corresponding to a rear top surface) exposed to the worker side in the dozer 114 which functions as the snow removal working unit. According to the configuration, as in the aforementioned second embodiment, various effects are obtained, that the worker performing the operation can be prevented from overlooking the information, and the display quality of the information indicated by the indicator lights LS is not influenced by the ground.

Further, in the aforementioned respective embodiments, the case of emitting the indicator lights LS to the surface exposed to the worker side which is located at the manipulation position, of the snow removal working unit 14 is described, but the indicator lights LS may be emitted to a proper surface that is exposed to the worker side in a front portion of the working machine 10 without being limited to the snow removal working unit 14.

REFERENCE SIGNS LIST

10 Working machine
11 Machine body
12 Power source
13 Travel device (travel unit)
14 Snow removal working unit (working unit)
15 Operation panel (operation device)
20 Headlight (illumination device)
40 Control unit
150 Indicator device (information providing unit)
LL Light
LS Indicator light
M Optical axis

What is claimed is:

1. A working machine including an illumination device and an information providing unit, said illumination device and said information providing unit being disposed between an operator and a front of said working machine, said illumination device being disposed so as to illuminate an area ahead of the working machine and said information providing unit providing information to the operator,
   wherein the information providing unit includes an indicator device that emits an indicator light indicating the information, an emitting direction of the indicator light deviating from an optical axis of an illuminating light of the illumination device;
   wherein the indicator device is disposed on the illumination device and emits the indicator light to a region outside of the area ahead of the working machine that is illuminated by the illumination device, wherein the region is located between a front of the working machine and the area illuminated by the illumination device, and wherein the front of the working machine blocks the light from the illumination device so as to form a shadow in said region to which the indicator light is emitted.

2. The working machine according to claim 1, wherein the indicator light is a light indicating at least any one of images including a color, flashing, and a character.

3. A working machine including an illumination device and an information providing unit, said illumination device illuminating an area ahead of the working machine and said information providing unit providing information to a worker, wherein an emitting direction of the indicator light deviates from an optical axis of an illuminating light of the illumination device;

wherein the information providing unit includes an indicator device that emits an indicator light indicating the information, the indicator device emitting the indicator light to a surface of a front portion of the working machine that is exposed to a worker side.

4. The working machine according to claim 3, wherein the indicator light is a light indicating at least any one of images including a color, flashing, and a character.

5. The working machine according to claim 3, wherein the indicator device is disposed on the illumination device.

\* \* \* \* \*